United States Patent [19]

Andreasen

[11] Patent Number: 4,738,223
[45] Date of Patent: Apr. 19, 1988

[54] HORSE TRAINING APPARATUS

[76] Inventor: Howard L. Andreasen, 2692 Willey's Lake Rd., Custer, Wash. 98240

[21] Appl. No.: 930,146

[22] Filed: Nov. 13, 1986

[51] Int. Cl.⁴ ............................................. A01K 15/02
[52] U.S. Cl. ...................................... 119/29; 273/366
[58] Field of Search .............. 119/29; 54/71; 446/313; 434/225; 273/359, 366, 369

[56] References Cited

U.S. PATENT DOCUMENTS

| | | | |
|---|---|---|---|
| 2,494,210 | 1/1950 | Smith | 273/369 |
| 2,819,900 | 1/1958 | Brackett | 119/29 |
| 3,047,295 | 7/1962 | Sachs | 446/313 X |
| 3,089,703 | 5/1963 | Wolverton et al. | 273/369 |
| 3,324,832 | 6/1967 | McCain | 119/29 |
| 3,406,969 | 10/1968 | Tisdell et al. | 273/366 |
| 3,802,706 | 4/1974 | Hamm | 273/339 |
| 3,962,995 | 6/1976 | Brinson | 119/29 |
| 4,266,779 | 5/1981 | English | 273/359 |
| 4,286,788 | 9/1981 | Simington et al. | 119/29 |

Primary Examiner—Robert P. Swiatek
Assistant Examiner—Mary E. McNeil
Attorney, Agent, or Firm—Hughes & Cassidy

[57] ABSTRACT

Apparatus for training cutting horses and other performance horses. The apparatus includes an endless carrier for a simulated animal and a reversible, variable speed drive for the endless carrier. Accordingly, an operator can cause the simulated animal to move along the path traversed by the endless carrier in different directions and at different speeds, and the simulated animal can be started and stopped at will.

10 Claims, 4 Drawing Sheets

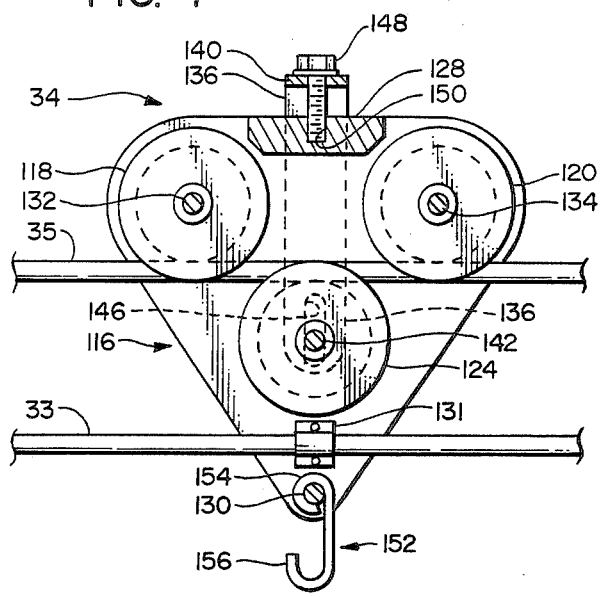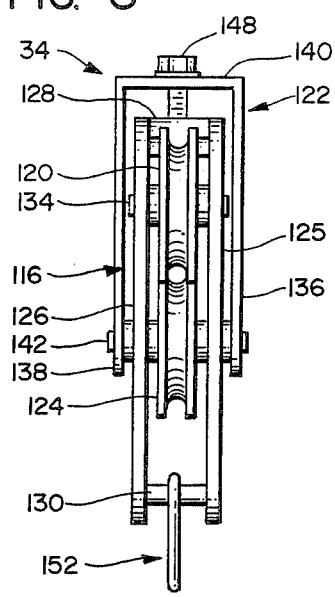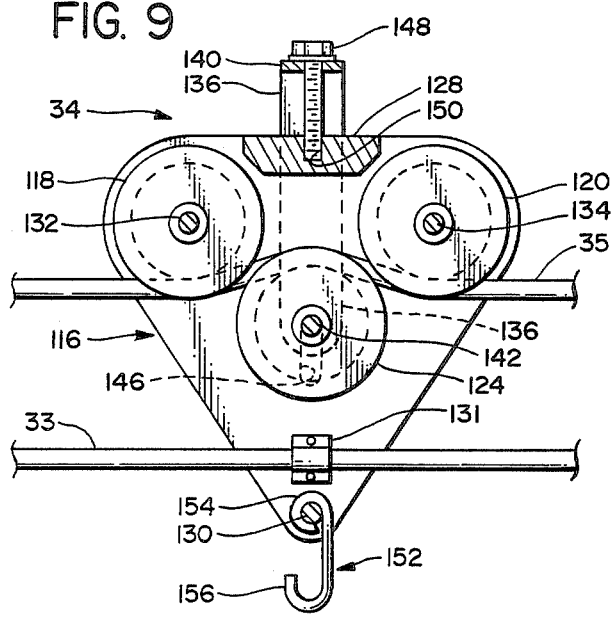

HORSE TRAINING APPARATUS

TECHNICAL FIELD OF THE INVENTION

The present invention relates to apparatus for training horses for cutting, roping, reining, bulldogging, and other tasks.

In the interest of clarity and brevity, the principles of the present invention will be developed primarily in relation to those embodiments of the invention which are employed in the training of cutting horses. This approach, however, is not intended to impose any limit on the scope of patent protection to which I consider myself entitled.

BACKGROUND OF THE INVENTION

Cutting horses are employed to so control the movement of a calf which has been separated from a herd of cattle as to confine the calf to a localized area. This is accomplished by continuously confronting the calf in a head-on manner and thereby thwarting its efforts to escape from the area in which it is thus penned by the cutting horse.

Training a horse to stay in front of, and continuously face, an erratically moving calf can be a time-consuming task; and it is extremely expensive when, as is conventional, live animals are employed in the training process.

The procurement and maintenance of the cattle is in itself expensive. Also, calves must be replaced at frequent intervals because they become accustomed to the cutting exercise and then move in a predictable, often lethargic manner which makes them useless for training, or demonstrating the abilities of, a cutting horse.

Furthermore, the maneuvers of a live calf can, in general, not be controlled in a manner which affords the maximum contribution to the education of the cutting horse.

Because of the drawbacks of using live animals, a number of mechanical devices for training horses to perform the tasks identified above have been proposed. Those of which I am aware are disclosed in the following U.S. Pat. Nos. : 2,819,900 issued Jan. 14, 1958, to Brackett for CALF-ROPING AMUSEMENT DEVICE; 3,324,832 issued June 13, 1967, to McCain for ROPING HORSE TRAINING DEVICE; 3,802,706 issued Apr. 9, 1974, to Hamm for MOTORIZED ROPING STEER; 3,962,995 issued June 15, 1976, to Brinson for APPARATUS FOR TRAINING CUTTING HORSES; 4,266,779 issued May 12, 1981, to English for ANIMATED ROPING TRAINING APPARATUS; and 4,286,788 issued Sept. 1, 1981, to Simington et al. for MECHANICAL ROPING STEER.

These heretofore proposed training devices are in many cases unacceptably complex. Among the devices with that disadvantage are those disclosed in the above-cited patents to McCain, Hamm, Brinson, and Simington et al.

The McCain device, for example, requires a complex track system, a reversible motor, and reduction gearing, all of which would make that device too expensive for many trainers.

Hamm employs a motorized, artificial animal which, again, would be too expensive to be within the reach of many trainers because of the large number of parts in the simulated animal. Furthermore, the gasoline engine Hamm employs to propel his artificial animal is undesirable because of the noise and fumes it would generate, particularly in an indoor arena (indoor arenas are often employed in training cutting horses).

Brinson's device would also be too expensive for many trainers because of the hydraulic system it requires. Furthermore, that device has an artificial animal support system which is undesirable as it has a number of components and sharp corners that might cause injury if struck by a horse being trained.

The Simington et al device is more complex than would in many cases be acceptable because of its articulated, artificial animal and the mechanism which is employed to suspend and animate that animal. Furthermore, that mechanism is fragile and could easily be damaged if it were run into by the animal being trained.

Another disadvantage of heretofore proposed, mechanical horse training devices is that the simulated animal they employ can not be moved back-and-forth or otherwise maneuvered with that degree of flexibility which is needed to properly train a cutting horse. Heretofore proposed devices that fall into this category are those disclosed in the above-cited patents to Brackett, Hamm, English, and Simington et al.

SUMMARY OF THE INVENTION

I have now invented, and have disclosed herein, novel, improved, horse training apparatus which does not have the above-discussed disadvantages of heretofore available apparatus of that type and is otherwise superior to such apparatus.

In general, my novel horse training apparatus includes a rope or other flexible, endless member trained around two pulleys located above the ground, arena floor, etc. where the apparatus is set up and at the opposite ends of a path along which the horse being trained or demonstrated is to be worked. One of these pulleys is fixed to a stationary support at one end of the path. The other is incorporated in a drive which is employed to displace the endless member in both directions along the foregoing path at a speed which can be controlled by the operator of the apparatus. This direction and speed of movement is imparted directly to a simulated or artificial animal suspended from the upper run of the endless member.

Aside from the endless carrier drive pulley, the drive system alluded to above includes a pulley shaft and a friction type, variable speed drive for rotating the drive pulley shaft at a faster or slower speed at the command of the operator. Also, by shifting a pulley shaft-mounted wheel of the friction drive from one side to the other of the axis of rotation of that drive's clutch plate or input member, the conveying member drive pulley can be caused to rotate in either a forward or reverse direction. Thus, the simulated animal suspended from the lower run of the endless carrier can be caused to move in either direction along the path traversed by that member at any point in its travel and at any speed within the range of the conveying member drive simply by displacing the shaft-mounted wheel along the cooperating clutch plate or input member.

In my novel horse training apparatus, the clutch output member and pulley shaft are carried by a frame. That frame can be pivoted to disengage the clutch by a shift lever which is also employed to shift the clutch output member along the input member of the clutch to thereby change the speed and/or direction of rotation of the pulley shaft. This allows changes in the rate and direction of movement of the simulated animal to be rapidly made in a manner which closely approximates those of a live animal.

Also contributing to realism and to efficient operation of the apparatus disclosed herein is a trolley for suspending the simulated animal from the endless carrier of the horse training apparatus. This trolley is so constructed that the friction between it and the endless carrier can be easily adjusted to a level which insures that the trolley and the simulated animal carried by the trolley stop when the friction clutch is disengaged. Also, the friction can be thus adjusted to compensate for tension adjustments made in the endless carrier to prevent excessive sag when the endless carrier is relatively long.

Perhaps the map or advantage of the novel horse training apparatus just described is that it is capable of replicating the random movements of a live animal with sufficient accuracy to train a cutting or other performance horse, yet is extremely simple. This makes my novel horse training apparatus affordable by virtually all trainers and other persons involved in the training of cutting and other performance horses.

At the same time, one can quickly and easily learn to operate the apparatus which makes it superior to training devices such as the one shown in the above-cited Brinson patent, for example. A skilled operator would be needed to manipulate the hydraulic control valves Brinson employs in the manner required to cause the artificial animal incorporated in that apparatus to maneuver in a realistic enough manner to educate the horse being trained.

Still another advantage of my novel apparatus is the absence of structural parts that might be struck by, and cause injury to, the horse being trained.

Yet another advantage of the horse training apparatus disclosed herein is that many of its components can be fabricated from an aluminum alloy or other lightweight material. This makes the apparatus easy to handle. Also, because of its light weight and simplicity, the apparatus is easy to set up and take down.

And another important advantage of the novel apparatus under discussion is that the operator can easily be positioned in a location where he can most advantageously observe the horse being trained.

Also, the apparatus is versatile in that it can be used to train roping, reining, and other performance horses as well as cutting horses.

OBJECTS OF THE INVENTION

From the foregoing, it will be apparent to the reader that the primary object of the present invention resides in the provision of novel, improved apparatus which is designed to be used in training horses for cutting, roping, reining, bulldogging, and other tasks.

Other important objects of my invention reside in the provision of apparatus as described in the preceding paragraph which:

is capable of maneuvering a simulated animal in a manner which closely approximates the movements of a live animal;

is capable of maneuvering a simulated animal in a manner that will best further the training of the horse being worked;

in conjunction with the two preceding objects, is capable of moving the animal in opposite directions and at different speeds and of stopping and starting the movement of the simulated animal at any point along its path at the will of the operator;

is simple and inexpensive and has a long service life; can be easily handled and easily and quickly set up and taken down;

does not require a skilled or trained operator;

has a near absence of parts that might injure the horse being trained if struck by that animal.

Other important objects and features and additional advantages of my invention will be apparent to the reader from the foregoing and the appended claims and as the ensuing detailed description and discussion proceeds in conjunction with the accompanying drawing.

BRIEF DESCRIPTION OF THE DRAWING

In the drawing

FIG. 7 is a vertical section through a trolley employed to suspend a simulated animal from an endless carrier in the apparatus of FIG. 1;

FIG. 8 is an end view of the trolley;

FIG. 9 is a view similar to FIG. 7 but showing the trolley adjusted to increase the frictional force between it and the endless carrier;

DETAILED DESCRIPTION OF THE INVENTION

Figure 1:
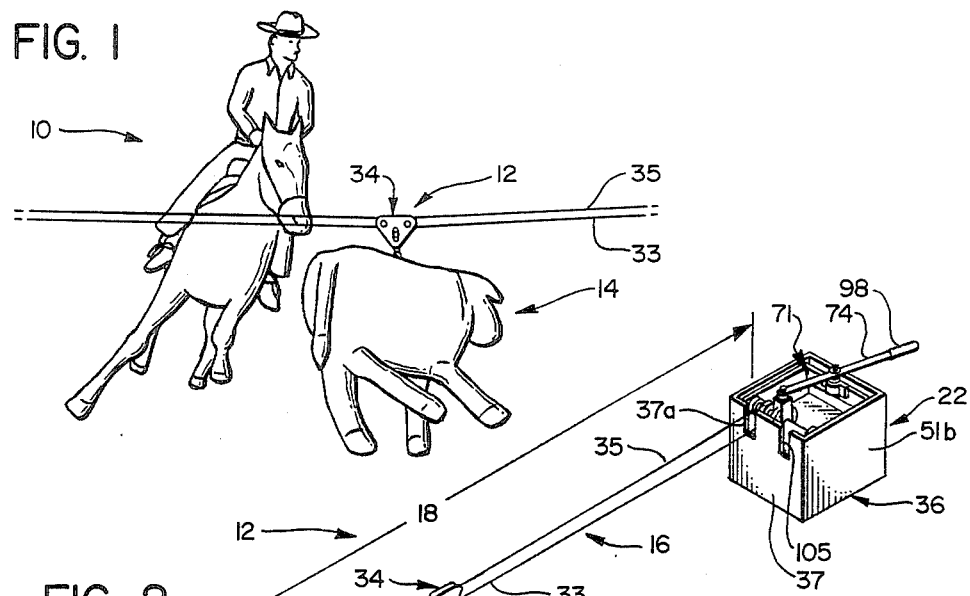
FIG. 1 is a pictorial view of a cutting horse being trained with the aid of apparatus constructed in accord with, and embodying, the principles of the present invention.

Referring now to the drawing, FIG. 1 depicts a cutting horse 10 being trained with apparatus 12 embodying, and constructed in accord with, the principles of the present invention.

Figure 2:
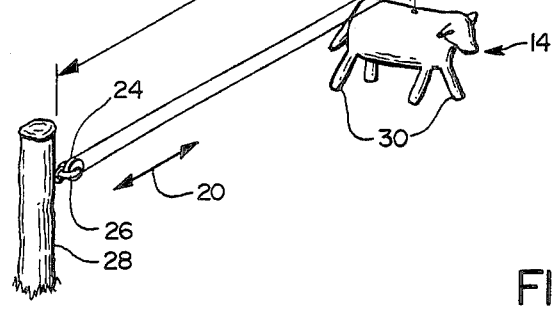
FIG. 2 is a pictorial view of the cutting horse training apparatus.

The major components of training apparatus 12 include a simulated or artificial animal 14 of stuffed or other appropriate construction; a rope or other flexible endless carrier 16 for suspending the simulated animal above the ground or floor of an arena or other area in which the training apparatus is being employed and for moving the simulated animal back and forth along the path 18 spanned by the flexible member as indicated by arrow 20 in FIG. 2. A third, major component of the training apparatus is a drive unit 22 which is employed to displace endless carrier 16, and therefore simulated animal 14, along path 18 in the direction, and at the speed, wanted by the operator of that unit.

At one end of path 18, endless carrier 16 is trained around a first, idler pulley 24 fixed as by a bracket 26 to a post or other support 28. The height is so selected that the feet 30 of simulated animal 14 will be close to, but not drag on, the ground or other surface above which it travels.

The opposite end of the endless carrier 16 is trained around a second, drive pulley 32 incorporated in drive unit 22.

Simulated animal 14 is suspended by a trolley 34 from the upper run 35 of endless carrier 16.

In addition to pulley 32, drive 22 unit includes an open top casing or housing 36 which will typically be fabricated from an aluminum alloy in the interest of having drive unit 22 be as light and easily handled as possible (see FIGS. 3-6). The upper part of the front wall 37 of casing 36 is slotted as indicated by reference character 37a to accommodate the upper and lower runs 35 and 33 of endless carrier 16.

Housed in casing 36 are: a pulley shaft 38, a motor 39, and a reversible, variable speed, friction drive 40 for connecting motor 39 to pulley (or drive) shaft 38.

Motor 39 is bolted to a horizontal platform 42 in casing 36.

Pulley shaft 38 is rotatably supported from the side members 44 and 46 of a U-shaped bracket 47 above platform 42 in bearings 48 and 50 which are bolted or otherwise fastened to the side members of the bracket.

Bracket 47 is pivotally supported from casing side walls 51a and 51b for rotation about a horizontal pivot axis 51c by pivot members 51d and 51e. Those pivot members extend between and are journalled in: (1) casing side wall 51a and the side member 44 of bracket 47 and (2) casing side wall 51b and the side member 46 of the racket.

Referring still primarily to FIGS. 3-6, the friction drive 40 by which motor 39 is drive-connected to pulley shaft 38 includes a wheel (or output member) 52 which rotates about a horizontal axis 53 and is equipped with a rubber tire 54 to minimize slippage. Wheel 52 is keyed to pulley shaft 38 for rotation therewith. The key (identified by reference character 55 in FIG. 4) fits into a complementary slot or keyway 56 which extends the length of pulley shaft 38. This allows wheel 52 to be displaced along shaft 38 while staying rotatably coupled to the shaft.

Friction drive 40 also includes a clutch disk (or input member) 57 fixed to the upper end of drive motor output shaft 58 for rotation therewith. Input member 57 rotates about a vertical axis 59 which intersects the axis of rotation 53 of pulley shaft 38 midway between the ends of that shaft.

The tire 54 of wheel 52 engages the upper surface 60 of clutch disk 57. Wheel 52 is accordingly driven by that clutch input member. And, as was suggested above, pulley shaft mounted wheel 52 is displaceable along shaft 38 in the manner described above. This allows the speed ratio between the output and input members 52 and 57 of the friction drive to be varied. That is, with wheel 52 shifted to a location near the periphery of clutch disk upper surface 60, as shown in phantom lines in FIG. 3, wheel 52 will rotate faster for any given speed of rotation of motor 39 than it will when the wheel is located at the more central position shown in solid lines in FIG. 3.

And, because wheel 52, shaft 38, and pulley 32 rotate as one, pulley 32 will be rotated faster and slower as wheel 52 is respectively shifted toward the periphery of clutch disk 57 and toward the center of that disk, thereby respectively increasing and decreasing the speed at which the artificial or simulated animal 14 is moved along the path 18 between drive unit 22 and post 28 (see FIG. 1) by the endless carrier 16 trained around drive pulley 32. Furthermore, as wheel 52 is shifted past the axis of rotation 59 of friction drive input member 57, wheel 52 will stop as it reaches axis 59, then reverse and turn in the opposite direction, reversing the direction of rotation of pulley 32 and the direction of movement of endless carrier 16. As a consequence, simulated animal 14 can be stopped and started and moved back-and-forth at the command of the training apparatus operator as well as moved at any speed he may select.

Figure 3:
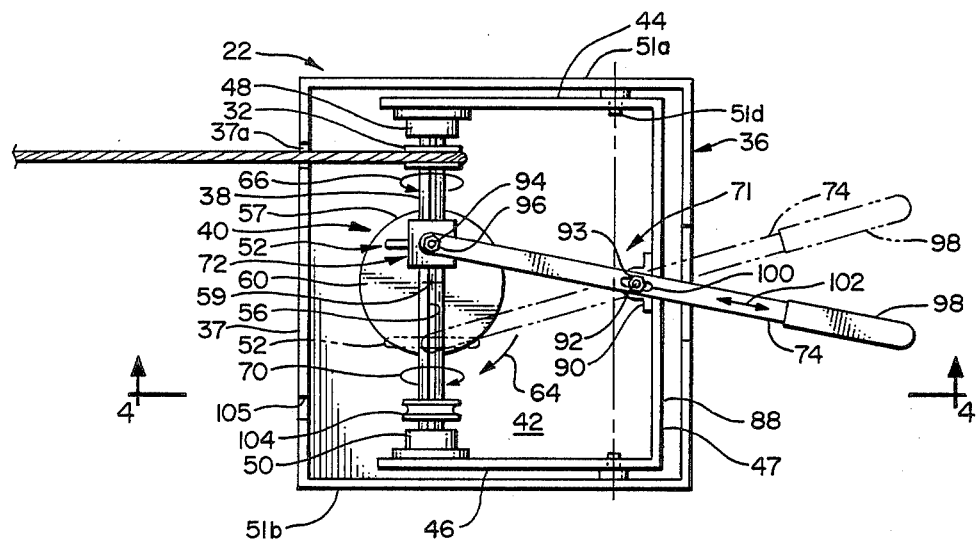
FIG. 3 is a top view of a reversible, variable speed drive unit employed in the training apparatus of FIGS. 1 and 2.
Figure 4:
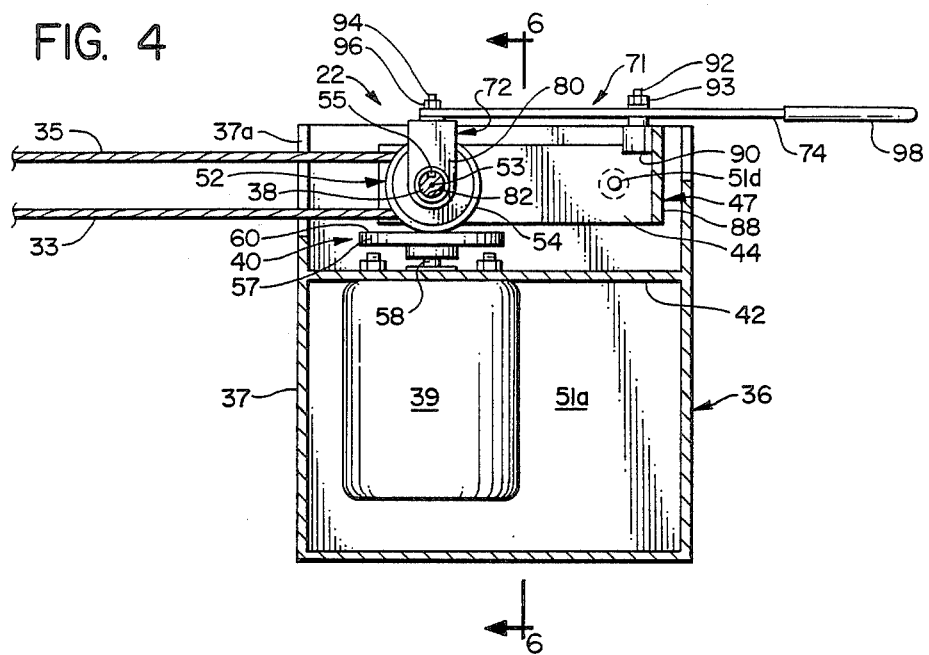
FIG. 4 is a vertical section through the drive unit, taken substantially along line 4—4 of FIG. 3 and showing a friction clutch incorporated in the drive unit engaged.

As an example, with the output shaft 58 of motor 39 and clutch disk 57 rotating in the clockwise direction shown by arrow 64 in FIG. 3 and the wheel 52 of friction drive 40 positioned as shown in solid lines in that figure and engaged with clutch input member 57 as shown in FIG. 4, input member 57, pulley shaft 38, and the drive pulley 32 for endless carrier 16 will rotate in a counterclockwise direction as indicated by arrow 66 in FIG. 3. That causes the upper run 35 of endless carrier 16 and simulated animal 14 to move along path 18 away from drive unit 22 toward the idler pulley 24 at the far end of the path. Conversely, with wheel 52 still engaged with clutch input member 57 but shifted to the phantom line position, the same clockwise rotation of clutch disk or input member 57 will now cause the wheel or clutch output member 52, pulley shaft 38, and pulley 32 to rotate in the opposite, clockwise direction as indicated by arrow 70 in FIG. 3. That causes the lower run 33 of endless carrier 16 and the simulated animal 14 suspended from carrier 16 to move from post 28 toward drive unit 22 along path 18.

Friction drive output member 52 is shifted across the input member 57 of the friction drive in the manner and for the purposes just described by a manually operable shift mechanism 71 which is also shown in FIGS. 3-6. The major components of the shift mechanism are a yoke 72 and a shift lever 74.

The yoke 72 of shift mechanism 71 has a horizontal base 76 and integral, parallel, spaced apart, depending legs 78 and 80. Drive shaft 38 extends through aligned apertures 82 in these legs (only one aperture is shown) and is accordingly rotatable relative to yoke 72.

Figure 6:
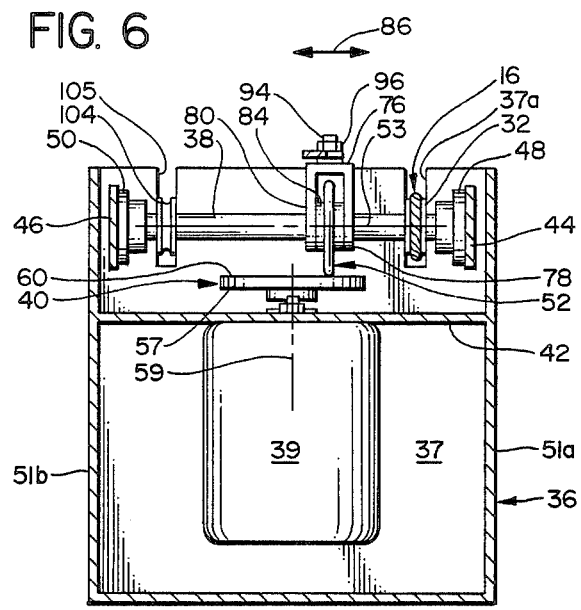
FIG. 6 is a second vertical section through the drive unit taken substantially along line 6—6 of FIG. 4.

As is best shown in FIG. 6, the two depending legs 78 and 80 of yoke 72 engage the opposite sides of the hub 84 of friction drive wheel or output member 52. Consequently, by shifting yoke 72 to the left or to the right as shown in FIG. 6 and indicated by arrow 86, clutch output member 52 may be displaced along shaft 38 to change the speed ratio of the friction drive and from one side of the axis of rotation 59 of clutch input member 57 to the other to reverse the direction of rotation of clutch output member 52, pulley shaft 38, and endless carrier drive pulley 32. This reverses the direction of movement of endless carrier 16 and simulated animal 14. As discussed above, these manipulations of the clutch output member are employed to change the speed at, and/or direction in which, artificial animal 14 moves along the path 18 between drive unit 22 and post 28 (see FIG. 1).

Referring still to FIGS. 3-6, the yoke 72 of shift mechanism 71 is displaced along drive shaft 38 for the purposes just discussed by the above referred to operating lever 74 of shift mechanism 71. That component of my novel training apparatus 12 is fixed to a transversely extending web 88 of clutch output member and pulley shaft supporting bracket 47 on the opposite side of pivot axis 51c from the clutch output member and pulley shaft. This operating lever is supported from web 88 for pivotable movement for rotation in a generally horizontal plane by a bracket 90 fastened in any convenient fashion to web 88, a pivot member 92 which extends upwardly from the bracket, and a retainer 93 threaded onto the upper end of the pivot member.

The inner end of lever 74 is pivotably connected to the yoke 72 of shift mechanism 71 by a pivot member 94 extending upwardly from the base 76 of the yoke. A retainer 96 threaded onto the pivot member holds the inner end of shift lever 74 in place.

Figure 5:
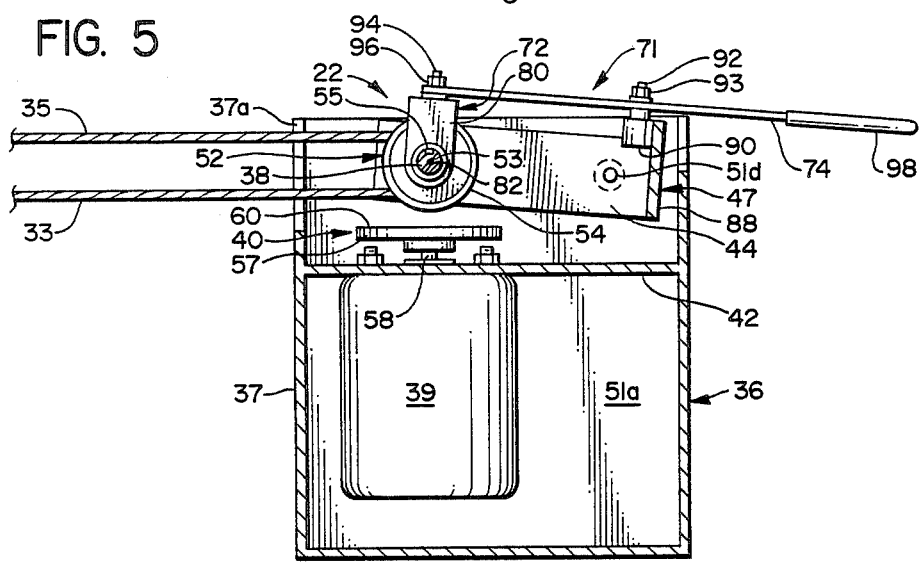
FIG. 5 is a view similar to FIG. 4 but showing the clutch of the drive unit disengaged.

By depressing a handle 98 fitted to the outer end of shift lever 74, U-shaped bracket 47 can be pivoted about axis 51c to raise clutch output member 52 away from clutch input member 57 and thereby disengage the clutch (see FIG. 5). This allows the speed ratio of friction drive 40 and the direction of rotation of output or pulley shaft 38 to be rapidly varied. As discussed above, these attributes promote the realism with which simulated animal 14 can be manipulated.

Conversely, by pulling up on handle 98, the frictional drive force between clutch input and output members 57 and 52 can be increased, as necessary, to insure that the full torque generated by motor 39 is transmitted to the clutch output member.

Handle 98 is installed on the outer end of shift lever 74 to make that lever more comfortable to operate. A slot 100 is formed in that member to accommodate the pivot member 92 by which the lever is secured to bracket 90. This slot accommodates that movement in the direction indicated by arrow 102 in FIG. 3 which shift mechanism lever 74 will undergo as the yoke 72 of the shift mechanism is respectively moved toward and away from the axis of rotation 59 of friction drive input member 57.

It will be noted from FIGS. 3 and 6 that a second pulley 104 is also fixed to drive shaft 38 for rotation therewith. Pulley 104 is located on the opposite side of friction drive 40 from pulley 32. This provision of two pulleys makes it more convenient to set up training apparatus 12 in locations where space to one side of path 18 may be limited because, by virtue of the dual pulley arrangement, drive unit 22 may be located on either side of that path.

A second slot 105 in the front wall 37 of casing 36 accommodates endless carrier 16 when that component is trained around pulley 104 instead of pulley 32.

As indicated above, the simulated animal 14 which is displaced along path 18 by drive unit 22 is suspended from the upper run 35 of endless carrier 16 by a trolley 34. That component of training apparatus 12 includes a framework or support 116 for pulleys 118 and 120 and a yoke 122 which can be displaced relative to support 116 to move a third, yoke-carried pulley 124 toward and away from pulleys 118 and 120 and thereby couple the simulated animal to the endless carrier.

That the simulated animal is thus connected to the endless carrier 16 is important for two reasons. One is that this method of connecting together the simulated animal 14 and the carrier keeps the simulated animal from moving along the carrier and thereby changing position when the endless carrier is halted. Also, this novel adjustable arrangement accommodates the variations in tension in endless carriers of different lengths which are necessary to prevent overtightening and excessive sagging.

As shown in FIGS. 8 and 9, the framework 116 of trolley 34 includes two side plates 125 and 126 held in parallel, spaced apart relationship and integrated into a single unit by a rectangularly sectioned upper block 128 and a circularly sectioned lower block 130. The lower run 33 of endless carrier 16 is fastened to one of those side plates 125 as by a clamp 131. As a consequence, the trolley and the simulated animal 14 suspended from the trolley are displaced along path 18 as the endless carrier is driven along that path by variable speed friction drive 40.

Upper pulleys 118 and 120 are supported from framework 116 in aligned, fore-and-aft relationship on axles 132 and 134 which extend, at their opposite ends, through the side plates 125, and 126 of the framework and are journalled in those side plates.

The yoke 122 associated with framework 116 has two depending arms 136 and 138 lying adjacent the side plates 125 and 126 of framework 116. These arms are connected by a transversely extending, integral web 140 which overlies the upper block 128 of the framework.

Lower pulley 124 is supported from yoke 122 by an axle 142. The axle extends between and through the lower ends of yoke arms 136 and 138.

Axle 142 also extends through vertically oriented slots in the side plates 125 and 126 of framework 116. One of these slots is illustrated in FIGS. 7 and 9 and identified by reference character 146.

These slots accommodate the vertical movement of yoke 122 and the axle 142 and pulley 124 carried by that yoke. They also guide lower pulley 124 in a vertical path as it is adjusted up and down with respect to the upper pulleys 118 and 120 to respectively increase and decrease the frictional connecting force between trolley 34 and endless carrier 16.

This vertical adjustment of yoke 122 relative to framework 116 is effected by an adjusting member 148. That component of trolley 34 is threaded through the framework-overlying web 140 of yoke 122. The lower end of the adjusting member is seated in a recess 150 in the upper block 128 of framework 116. Therefore, by rotating adjusting member 148 clockwise, for example, yoke 122 can be displaced upwardly to increase the frictional forces between upper endless carrier run 35: and (a) lower pulley 124 and (b) upper pulleys 118 and 120.

Referring still to FIGS. 7-9, one final component of trolley 34 is a hooklike device 152 by which simulated animal 14 is suspended from trolley 34. The upper end of this device terminates in a loop 154 through which the circularly sectioned lower block 130 of trolley framework 116 extends. The lower end of the device is a J-shaped hooklike portion 156 to which the simulated animal is attached.

FIG. 2 shows training apparatus 12 as it would be set up in an appropriate location in an indoor or outdoor arena to train a cutting horse.

To train a roping horse, apparatus 12 would be similarly set up. The horse being worked and simulated animal 14 would be started from that end of path 18 at which drive unit 22 is located with animal 14 being started first to simulate the release of a live animal from a chute.

Figure 10:
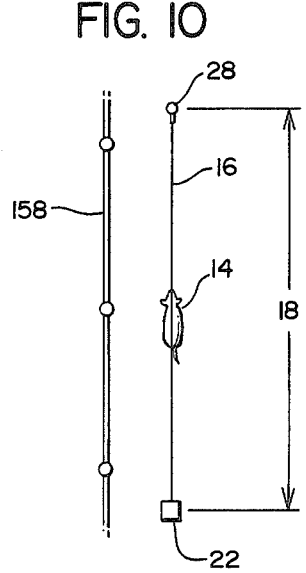
FIG. 10 is a pictorial view of the apparatus set up along a wall or rail to train a reining horse.

FIG. 10 shows the training apparatus 12 set up adjacent, and with path 18 paralleling, a barrier such as a wall or the illustrated rail 158. This setup would be used if apparatus 12 were being employed to train a reining horse.

Figure 11:
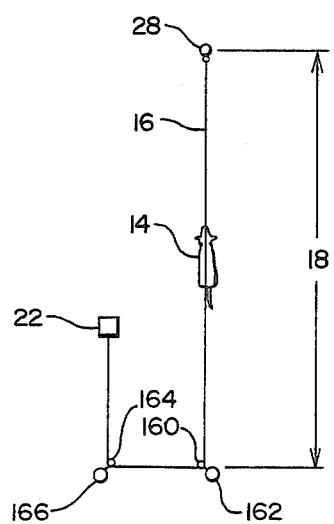
FIG. 11 is a pictorial view showing the apparatus set up to give the operator an optimum view of the horse being trained.

FIG. 11 shows one exemplary, alternate setup that may be utilized to locate the operator of apparatus 12 so that he will have an optimum, unobstructed view of the horse being trained as that horse moves along path 18. In this setup, drive unit 22 (and, consequentially, the operator of the training apparatus), are located beside, and along, the path 18 which the simulated animal 14 traverses rather than at one end of that path.

At the far end of the path, the endless carrier 16 for simulated animal 14 is trained around a pulley 24 supported from a post 28 as in the setup shown in FIG. 1. However, at the opposite drive unit end of path 18, the upper and lower runs 35 and 33 of carrier 16 are trained around intermediate idler pulleys 160 (only one of which is shown), each supported from a post 162.

To carry the endless carrier from post 162 to drive unit 22 without too large of a change in direction (which might cause binding), the two runs of the endless member are also preferably trained around a second set of intermediate idler pulleys 164 (only one of which is shown). This pair of pulleys 164 is supported from a post 166. That post is so located with respect to post 162 that the runs of the endless carrier make a first 90 degree turn as they round pulleys 160 and a second 90 degree turn as they round pulleys 164.

It will be apparent to the reader that my invention may be embodied in specific forms other than those disclosed above without departing from the spirit or essential characteristics of the invention. The embodiments of the invention disclosed above are therefore to be considered in all respects as illustrative and not restrictive. The scope of the invention is instead indicated by the appended claims, and all changes which come within the meaning and range of equivalency of the claims are intended to be embraced therein.

What I claim as my invention is:

1. Apparatus for training a horse for cutting, roping, bulldogging, and other tasks, said apparatus comprising: an endless carrier; a simulated animal suspended from said endless carrier; and a drive unit for displacing said endless carrier and the simulated animal suspended therefrom back-and-forth along a path and at different speeds at the command of an operator, said drive unit comprising: a pulley around which said endless carrier is trained; a pulley shaft to which said pulley is fixed for rotation therewith; a friction drive output means for rotating said pulley shaft; a friction drive input means which is drivingly engageable with said output means; means for rotating said input means about an axis which is normal to the axis of rotation of the output means; means for rotating said friction drive input means to thereby rotate said friction drive output means and thereby displace said endless carrier and said simulated animal along a path traversed by said endless carrier; and operator-manipulatable means for shifting said friction drive output means toward the periphery and toward the axis of rotation of the friction drive input means to respectively increase and decrease the speed ratio between said friction drive input and output means and, consequentially, the speed with which said endless carrier and said simulated animal are displaced along said path.

2. Apparatus as defined in claim 1 wherein the means for shifting the friction drive output means is capable of shifting said output means relative to said friction drive input means over a span which includes the axis of rotation of said input means, whereby said output means can be caused to rotate both at different speeds and in opposite directions to displace said endless carrier and the simulated animal suspended therefrom in opposite directions and at different speeds along said path at the will of the operator.

3. Apparatus as defined in claim 1 wherein: said drive unit is located at one end of said endless carrier, said apparatus also includes a support at the opposite end of said endless carrier and an idler pulley fixed to said support, and said endless carrier is trained around said idler pulley and the drive pulley incorporated in the friction drive unit.

4. Apparatus as defined in claim 1 which includes a housing, means frictionally supporting said friction drive input means from said housing, a frame, means pivotally supporting said frame from said housing for rotation relative thereto about a pivot axis, means rotatably supporting said pulley shaft and said friction drive output means from said frame, and means so supporting said shifting means on the opposite side of said pivot axis from said pulley shaft and said friction drive output means that said frame can be pivoted about said pivot axis by said shifting means to engage said friction drive input and output means and to disengage said input and output means.

5. Apparatus as defined in claim 1 wherein said endless carrier has an upper run and a lower run and wherein the means for suspending said simulated animal from said endless carrier comprises a trolley, said trolley including first trapping means and second trapping which one of said endless carrier runs can be to couple said trolley to said one carrier run and means incorporated therein for suspending said simulated animal from said trolley.

6. Apparatus as defined in claim 5 wherein said trolley includes means for displacing said first carrier run trapping means relative to the second said carrier run trapping means and thereby adjusting the frictional connecting force between said trolley and said one endless carrier run.

7. Apparatus as defined in claim 6 wherein said trolley comprises a framework, means supporting said first carrier run trapping means from said framework, a yoke having a portion overlying said framework, means for supporting said second carrier run trapping means from said yoke, and an adjusting member threaded through the overlying portion of said yoke and into engagement with said framework whereby, as said adjusting member is rotated, the spacing between said yoke and said framework is changed to thereby vary the spacing between said first and said second carrier run trapping means.

8. Apparatus as defined in claim 1 which also comprises an idler pulley at the distal end of the path spanned by said endless carrier, said endless carrier being trained around said idler pulley.

9. Apparatus as defined in claim 8 which includes two sets of intermediate pulleys and wherein said endless carrier has upper and lower runs, said sets of intermediate idler pulleys being so located relative to said drive unit and said first-mentioned idler pulley that said path makes two turns between said drive unit and said first-mentioned idler pulley and so locates said drive unit relative to said path as to provide an operator with an unobstructed view of said simulated animal as the animal moves along said path.

10. The combination of apparatus as defined in claim 1 and a rail paralleling the path traversed by said endless carrier and thereby enhancing the usefulness of said apparatus in the training of a reining horse.

* * * * *

UNITED STATES PATENT AND TRADEMARK OFFICE
CERTIFICATE OF CORRECTION

PATENT NO. : 4,738,223
DATED : April 19, 1988
INVENTOR(S) : Howard L. Andreasen

It is certified that error appears in the above—identified patent and that said Letters Patent is hereby corrected as shown below:

In the Specification:

Column 3, line 15, "map or" has been changed to --major--.

Column 5, line 31, "racket" has been changed to --bracket--.

Column 10, line 28, before "which" the words --means between-- have been inserted.

Column 10, line 28, after "be" the word --trapped-- has been inserted.

Signed and Sealed this

Twelfth Day of December, 1989

Attest:

JEFFREY M. SAMUELS

Attesting Officer     Acting Commissioner of Patents and Trademarks